United States Patent
Uihlein

(10) Patent No.: US 12,543,934 B2
(45) Date of Patent: Feb. 10, 2026

(54) J-TIP PROTECTIVE CAP

(71) Applicant: EPflex Feinwerktechnik GmbH, Dettingen/Erms (DE)

(72) Inventor: Bernhard Uihlein, Dettingen (DE)

(73) Assignee: EPflex Feinwerktechnik GmbH, Dettingen/Erms (DE)

(*) Notice: Subject to any disclaimer, the term of this patent is extended or adjusted under 35 U.S.C. 154(b) by 899 days.

(21) Appl. No.: 17/262,606

(22) PCT Filed: Jul. 8, 2019

(86) PCT No.: PCT/EP2019/068298
§ 371 (c)(1),
(2) Date: Jan. 22, 2021

(87) PCT Pub. No.: WO2020/020625
PCT Pub. Date: Jan. 30, 2020

(65) Prior Publication Data
US 2021/0345864 A1 Nov. 11, 2021

(30) Foreign Application Priority Data
Jul. 24, 2018 (DE) ...................... 10 2018 212 321.7

(51) Int. Cl.
| A61B 1/01 | (2006.01) |
| A61B 1/00 | (2006.01) |
| A61M 5/32 | (2006.01) |

(52) U.S. Cl.
CPC ............ *A61B 1/01* (2013.01); *A61B 1/00101* (2013.01); *A61B 1/00135* (2013.01); *A61M 5/3273* (2013.01)

(58) Field of Classification Search
CPC ... A61B 1/01; A61B 1/00101; A61B 1/00135; A61M 5/3273; A61M 25/09041; A61M 25/002
See application file for complete search history.

(56) References Cited

U.S. PATENT DOCUMENTS 5,851,189 A * 12/1998 Forber ............ A61M 25/09041
604/528
2005/0234369 A1* 10/2005 Voorhees ........ A61M 25/09041
606/1
(Continued)

FOREIGN PATENT DOCUMENTS

WO WO 2015/187404 A1 12/2015

OTHER PUBLICATIONS

International Search Report (PCT/ISA/210) issued in PCT Application No. PCT/EP2019/068298 dated Nov. 15, 2019 with English translation (four (4) pages).
(Continued)

*Primary Examiner* — Michael J Carey
*Assistant Examiner* — Christen A. Sharpless
(74) *Attorney, Agent, or Firm* — Crowell & Moring LLP

(57) ABSTRACT

A J-tip protective cap for a J-tip of a medical guide wire includes a proximal sleeve section, a distal hollow disk-shaped J-tip receiving section, which extends distally and laterally on one side in a distal end region of the sleeve section with a disk longitudinal axis perpendicular to a longitudinal axis of the sleeve section and forms a J-tip receiving space in the interior, and a J-tip passage slot which leads proximally into the J-tip receiving space and which is composed of an axial slot section in the sleeve section and a circumferential slot section in the J-tip receiving section. The J-tip receiving space has a tapered region, in which it tapers in a radially outward direction in its lateral width, and opposite inner sides of the J-tip receiving section form J-tip contact surfaces in the tapered region of the J-tip receiving space.

8 Claims, 2 Drawing Sheets

(56) References Cited

U.S. PATENT DOCUMENTS

2011/0178506 A1    7/2011  Numata et al.
2015/0352317 A1*  12/2015  Hamilton ........... A61B 1/00131
                                                         206/363
2016/0354282 A1*  12/2016  Macy, Jr. ................ A61J 3/002

OTHER PUBLICATIONS

German-language Written Opinion (PCT/ISA/237) issued in PCT Application No. PCT/EP2019/068298 dated Nov. 15, 2019 (six (6) pages).
German-language Office Action issued in German Application No. 10 2018 212 321.7 dated May 8, 2019 (six (6) pages).

* cited by examiner

J-TIP PROTECTIVE CAP

BACKGROUND AND SUMMARY OF THE INVENTION

The invention relates to a J-tip protective cap for a J-tip of a medical guide wire, wherein the J-tip protective cap comprises a proximal sleeve section, a distal hollow disk-shaped J-tip receiving section, which extends distally and laterally on one side in a distal end region of the sleeve section with a disk longitudinal axis perpendicular to a longitudinal axis of the sleeve section and forms a J-tip receiving space in the interior, and a J-tip passage slot which leads proximally into the J-tip receiving space and which is composed of an axial slot section in the sleeve section and a circumferential slot section in the J-tip receiving section.

In medical endoscopy technology, J-tip guide wires are frequently used, the distal end of which is bent over, forming a J-tip. J-tip protective caps are used to protect the J-tips as long as the guide wire has not yet been put into use, in particular following the production of the guide wire, during transport and during storage. The guide wire produced is normally stored in coiled form in what is known as a dispenser. From the dispenser, the guide wire can be pushed out for use, preferably by means of simple one-handed operation, for which purpose an insertion aid suitable for the one-handed operation can be assigned to the dispenser.

As compared with known J-tip protective caps of other designs, this generic type of J-tip protective cap considered above has some advantages. It can be produced relatively simply and economically, has a slim, space-saving form, and the proximal sleeve section can be used to push the J-tip protective cap onto a mouthpiece of the insertion aid, which is usually provided as a conical section at the distal end of the insertion aid. The distal hollow disk-shaped J-tip receiving section forms a suitable receiving space in its interior for the J-tip of the guide wire and extends distally and laterally on one side in the distal end region of the sleeve section. As a result of the substantially one-sided lateral extent of the J-tip receiving section as compared with the sleeve section, the sleeve section can be kept smaller in its lateral extent than the J-tip receiving section or the J-tip of the guide wire that is to be protected, and the protective cap can extend substantially flush on the opposite lateral side at the transition of sleeve section and J-tip receiving section. The J-tip passage slot is composed of an axial section in the sleeve section and a circumferential slot section in the J-tip receiving section and, as a result of this configuration, facilitates the insertion of the J-tip of the guide wire into the receiving space as the protective cap is fitted and the passage of the J-tip out of the receiving space when the protective cap is removed, i.e. the fitting slot facilitates the passage i.e. the movement of the J-tip of the guide wire in and out during the fitting and removal of the protective cap. A J-tip protective cap of this type has been offered and marketed, for example, by the Qosina company under the model number 32110.

In conventional J-tip protective caps of the generic type, it is to be observed that the J-tip of the guide wire can escape from the receiving space of the protective cap under unfavorable circumstances, for example during transport of the dispenser with the guide wire, the insertion aid and the fitted protective cap. This can be caused in particular by thrust forces in the distal direction on the guide wire. The guide wire is pushed forward and, in the process, the J-tip of the guide wire slides along on the typically circular arc-shaped radial inner rim of the J-tip receiving section of the protective cap, which is conformal with the J-tip, and, as a result, is deflected proximally and passes through the J-tip passage slot in the proximal and optionally additionally lateral direction out of the J-tip receiving space and therefore out of the protective cap overall, so that it is then no longer protected by the protective cap.

A further conventional J-tip protective cap is disclosed in laid-open publication US 2005/0234369 A1. This protective cap includes a proximal section and a distal hollow disk-shaped J-tip receiving section, which extends distally and laterally on one side in a distal end region of the proximal section with a disk longitudinal axis perpendicular to a longitudinal axis of the proximal section and forms a J-tip receiving space in the interior. The proximal section is configured in a specific way as a web-like extension with a circular arc-shaped cross section in such a way that a guide wire feed unit of a first type or a guide wire feed unit of a second type can selectively be fitted detachably thereto.

The invention is based on the technical problem of providing a J-tip protective cap of the type mentioned at the beginning which is improved as compared with the aforementioned prior art, in particular with regard to unintended escape of the J-tip of the guide wire received in the protective cap before the use thereof or before the removal of the protective cap, for example from a mouthpiece of an insertion aid.

The invention solves this problem by providing a J-tip protective cap configured for protecting a J-tip of a medical guide wire and comprises a proximal sleeve section a distal hollow disk-shaped J-tip receiving section, which extends distally and laterally on one side in a distal end region of the sleeve section with a disk longitudinal axis perpendicular to a longitudinal axis of the sleeve section and forms a J-tip receiving space in the interior, and a J-tip passage slot which leads proximally into the J-tip receiving space and which is composed of an axial slot section in the sleeve section and a circumferential slot section in the J-tip receiving section. In this protective cap, the J-tip receiving space comprises a tapered region, in which it tapers in a radially outward direction in its lateral width, and opposite inner sides of the J-tip receiving section form J-tip contact surfaces in the tapered region of the J-tip receiving space, that is to say surfaces with which an accommodated J-tip comes into contact. It transpires that the receiving space configured in this way is able to accommodate the J-tip of a guide wire comparatively safely and reliably. In particular, it can be observed that the protective cap according to the invention configured in this way protects the accommodated J-tip of the guide wire substantially better against unintended escape from the protective cap through the passage slot than is the case in the aforementioned conventional protective cap of the generic type.

In the protective cap according to the invention, the J-tip of the guide wire can rest laterally against the contact surfaces of the receiving section of the protective cap at a distance from the radially outer rim of the J-tip receiving space under the effect of thrust force. As a result, the opposing contact force of the receiving section on the J-tip of the guide wire does not act only in the proximal direction, as is the case in the aforesaid conventional protective cap type of the generic type, in which the J-tip rests exclusively against the radial inner rim of the J-tip receiving section, but with a significant and preferably predominant force component in the transverse direction, which merely leads to a problem-free lateral compressive loading of the J-tip. In addition, the J-tip tends to be forced radially further into the receiving space of the protective cap in the tapering direction, without the J-tip reaching into the receiving space entirely as far as the radial outer rim, i.e. the inserted J-tip remains at a distance from the radially outer rim of the J-tip receiving space, i.e. the radially inner edge region of the receiving section. As compared with conventional configurations, in which the J-tip receiving space has a constant lateral width in the radially outward direction or terminates at the radial outer rim with a semicircular cross section, this results in an additional clamping action or an additional sliding resistance, which is provided by the receiving section for the accommodated J-tip of the guide wire. The radial inner edge region of the receiving section does not come into opposing force contact with the J-tip of the guide wire and cannot therefore exert any opposing force on the J-tip, which could promote the escape of the J-tip of the guide wire rearward through the passage slot.

In a development of the invention, the lateral width of the J-tip receiving space tapers conically from a maximum width which is greater than a diameter of the J-tip of the guide wire to be inserted, and is optionally smaller than twice the diameter of the J-tip to be inserted, to a minimum width which is smaller than the diameter of the J-tip to be inserted. This constitutes an implementation of the taper which is advantageous in terms of production and function. Here, conically is not to be understood as only an exact rectilinear course of the converging contact surfaces of the J-tip receiving section but also another type of continuously tapering course, for example an entirely or sectionally curved course, such as a rounded course in the shape of a needle tip.

In a development of the invention, a cone angle of the conical taper of the lateral width of the J-tip receiving space of the protective cap lies in the range between 10° and 90°. It transpires that this cone angle range for many applications offers very high protection against the J-tip of the guide wire inadvertently sliding out of the J-tip receiving space of the protective cap. In corresponding applications, a cone angle of less than 10° or more than 90° can even alternatively be suitable for this purpose.

In a refinement of the invention, the cone angle of the conical taper of the lateral width of the J-tip receiving space of the protective cap lies in the range between 20° and 60°. This proves to be a cone angle range which is optimal for many applications and also advantageous in production terms for the conical lateral taper of the receiving space protecting against the inadvertent escape of the J-tip of the guide wire from the protective cap or its receiving space.

In a development of the invention, the J-tip receiving section comprises, at least in the region of the conical taper of the J-tip receiving space, a roughened and/or profiled surface and/or a surface made a material with a high coefficient of adhesive friction relative to the material of the J-tip of the guide wire to be accommodated. The latter means that the material pairing of the J-tip to be accommodated and the receiving section surface against which the J-tip rests when it is accommodated, provides a comparatively high adhesive friction which is higher than in the corresponding material pairing when the aforementioned conventional protective cap of the generic type is used. The coefficient of adhesive friction can be, for example, at least about 0.2, preferably at least 0.3 and more preferably at least 0.5. These alternatively realizable measures can, on their own and in any desired combination, protect more comprehensively against unintended escape of the J-tip of the guide wire out of the J-tip receiving space of the protective cap.

In a development of the invention, the protective cap comprises a grip profile on its outer side. This can improve the handling of the protective cap, in particular when being placed on the J-tip of the guide wire or the mouthpiece of the insertion aid and in a corresponding way during removal.

In a development of the invention, the proximal sleeve section of the protective cap comprises a rear slot. This can be beneficial in production terms and/or facilitate the fitting of the protective cap to a mouthpiece of an insertion aid. By means of the rear slot, the elastic flexibility of the proximal sleeve section of the protective cap is increased with otherwise identical parameters, such as sleeve diameter, sleeve thickness, sleeve material, etc. This can contribute to improved and facilitated plugging of the protective cap by its proximal sleeve section onto a mouthpiece of an insertion aid by means of a detachable clipping or latching connection.

Advantageous embodiments of the invention are illustrated in the drawings. These and further embodiments of the invention will be explained in more detail below.

DETAILED DESCRIPTION OF THE DRAWINGS

Figure 1:
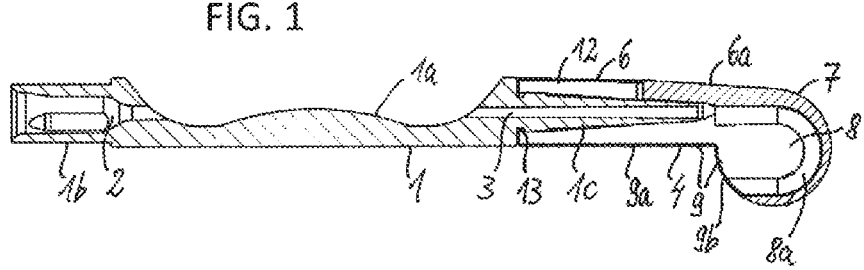
FIG. 1 shows a longitudinal sectional view of a guide wire insertion aid with a J-tip protective cap fitted without a guide wire inserted.
Figure 2:
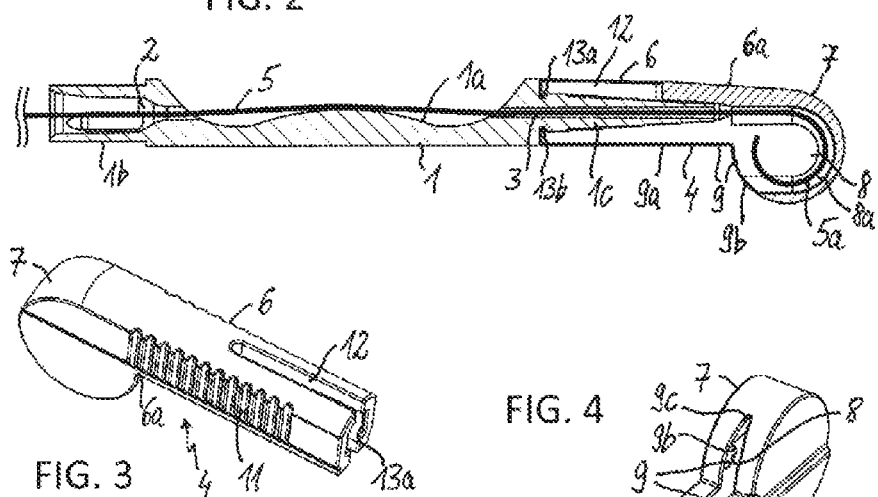
FIG. 2 shows the view from FIG. 1 with a guide wire inserted.
Figure 3:
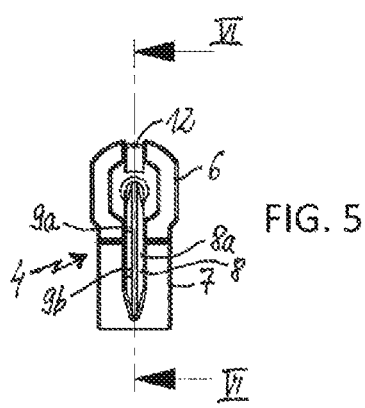
FIG. 3 shows a perspective view obliquely from above of the J-tip protective cap used in FIGS. 1 and 2.
Figure 4:
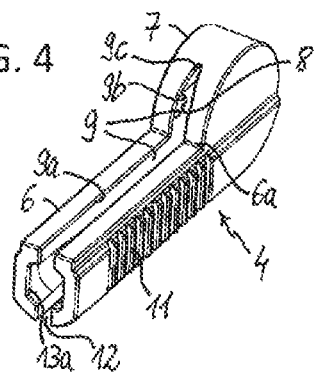
FIG. 4 shows a perspective view of the protective cap obliquely from below.
Figure 5:
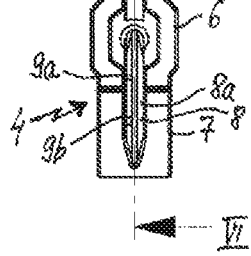
FIG. 5 shows a plan view of the protective cap from the rear.
Figure 6:
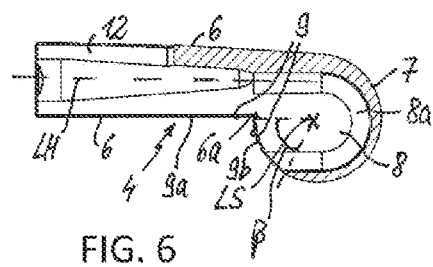
FIG. 6 shows a sectional view along a line VI-VI in FIG. 5.
Figure 7:
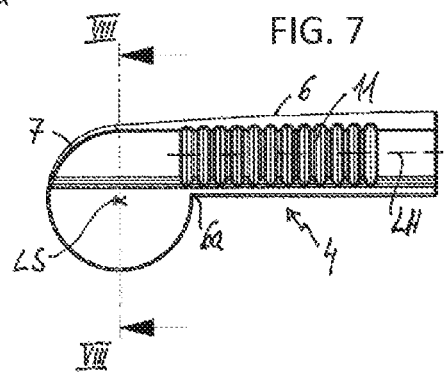
FIG. 7 shows a side view of the protective cap.
Figure 8:
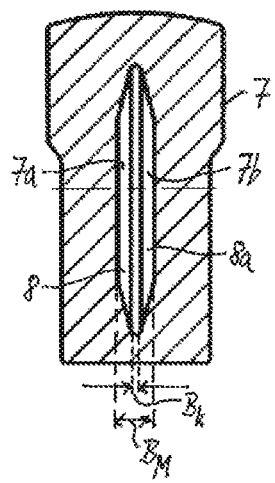
FIG. 8 shows a sectional view along a line VIII-VIII in FIG. 7.

FIGS. 1 and 2 illustrate an insertion aid 1 of conventional design, as is used for guide wires, for example those of the type with a J-tip, for example in conjunction with a dispenser in which the guide wire is stored, preferably in coiled form. The insertion aid has a longitudinally extended, substantially cylindrical form with a central clearance section 1a, a proximal, sleeve-like guide section 1b and a distal mouthpiece section 1c in the form of a conical sleeve tapering on the outside distally toward the front. The proximal guide section 1c comprises a passage opening 2 which opens into the clearance section 1a, and a passage hole 3 leads distally toward the front through the mouthpiece section 1c from the clearance section 1a. FIG. 2 shows how a guide wire 5 extends through the proximal passage opening 2, along the clearance section 1a and through the distal passage hole 3 when it is introduced into the insertion aid 1. In the clearance section 1a, the guide wire 5 can be pushed forward by a user by means of one-handed operation, for example with his thumb, and therefore, for example, moved out of a dispenser. The guide wire 5 shown is of the type having a J-tip 5a. To protect the latter, a J-tip protective cap 4 is removably fitted to the distal mouthpiece section 1c of the insertion aid 1. The insertion aid 1 itself is, as stated, of a design known per se and therefore needs no further explanations here.

The J-tip protective cap 4 is illustrated further in the illustrations of FIGS. 3 to 10. As can be seen therefrom, the protective cap 4 includes a proximal sleeve section 6 and a distal hollow disk-shaped J-tip receiving section 7, which extends distally and on one side in a distal end region 6a of the sleeve section with a disk longitudinal axis LS perpendicular to a longitudinal axis LH of the sleeve section 6, and forms a J-tip receiving space 8 in the interior. Furthermore, the protective cap 4 includes a J-tip passage slot 9 which leads proximally into the receiving space 8 and which is composed of an axial slot section 9a in the sleeve section and a circumferential slot section 9b in the receiving section 7. The receiving space 8 has a tapered region 8a, in which it tapers in the radially outward direction in its lateral width, and opposite inner sides of the receiving section 7 form J-tip contact surfaces 7a, 7b in the tapered region 8a of the J-tip receiving space.

The circumferential slot section 9b of the passage slot 9 extends from the axial slot section 9a along the circumference of the receiving section 7 over a predefinable circumferential slot angle β. The circumferential slot angle θ lies for example in the range between 45° and 90°, wherein in many cases a choice of the circumferential slot angle θ in the range from 60° to 90° is advantageous, in particular with regard to easy insertion of the J-tip 5a of the guide wire 5 as the protective cap 4 is fitted and easy escape of the J-tip 5a from the receiving chamber 8 as the protective cap 4 is removed. In corresponding embodiments, as in the exemplary embodiment shown, it is advantageous if the passage slot 9 tapers conically at the end of its circumferential slot section 9b in a manner corresponding with the internal J-tip receiving space 8, i.e. ends with a conically tapering slot end 9c.

In corresponding embodiments, the lateral width of the receiving space 8, as in the example shown, tapers conically from a maximum width BM, which is greater than a diameter d of the J-tip of the guide wire 5 that is to be inserted, and is preferably smaller than twice the diameter 2d of the J-tip to be inserted, to a minimum width Bk, which is smaller than the diameter d of the J-tip to be inserted, wherein the minimum width Bk can have any desired value smaller than the J-tip diameter d, including zero, and in a corresponding way the radial outer termination of the receiving space 8 can be of any desired shape in cross section, for example tapering to a tip or in the form of a line of curvature like a circular arc. The conical course of the contact surfaces 7a, 7b of the receiving section 7 which delimit the width of the receiving space 8 in the tapered region 8a can, as shown, be rectilinear or alternatively at least partly curved.

Figure 9:
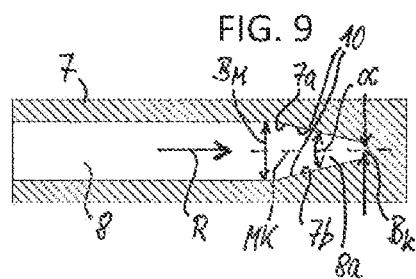
FIG. 9 shows a schematic cross-sectional view of a J-tip receiving section of the protective cap without a J-tip inserted.
Figure 10:
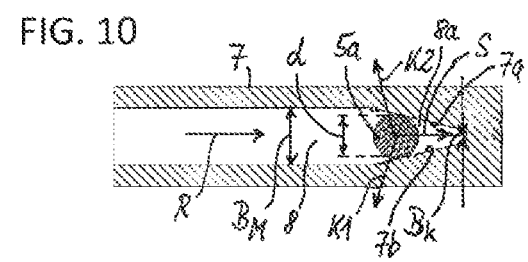
FIG. 10 shows the view of FIG. 9 with a J-tip inserted.

In other words, in a corresponding cross-sectional view, as in FIGS. 9 and 10, the receiving space 8 is delimited by opposite inner sides of the receiving section 7 which, in the tapered region 8a of the receiving space 8, form the contact surfaces 7a, 7b pointing in radially outward direction R, for example converging conically toward each other, against which the J-tip 5a of the guide was 5 rests when the guide wire 5 is inserted with its J-tip 5a into the protective cap 4. In alternative embodiments, the taper of the receiving space 8 in the tapered region 8a is implemented discontinuously in the radial direction R, for example stepped in multiple steps.

In corresponding embodiments, as in the exemplary embodiment shown, a cone angle α of the conical taper of the lateral width of the J-tip receiving space 8 lies in the range between 10° and 90°. For specific applications, it is advantageous if the cone angle α lies specifically in the range from 10° and 45°, for example between 25° and 35°. Alternatively, in appropriate applications, other values for the cone angle α less than 10° or greater than 90° can also be used.

In corresponding embodiments, as in the exemplary embodiment shown, the two opposite contact surfaces 7a, 7b of the receiving section 7 extend symmetrically with respect to a cone mid-axis MK extending in the radial direction R. In alternative embodiments, they extend asymmetrically, for example in such cases the one contact surface 7a or 7b may be parallel to the radial direction R and only the other contact surface 7b or 7a may enclose an acute angle with the radial direction R, or both contact surfaces 7a, 7b lie obliquely relative to the radial direction with different oblique angles.

In corresponding embodiments, the J-tip receiving section 7 comprises, at least in the tapered region 8a of the J-tip receiving space 8, a roughened or profiled surface or a surface made of a material with a high coefficient of adhesive friction relative to the material of the J-tip, which, for example, is 0.2 or more, preferably at least 0.3 or at least 0.5. In the example shown, a roughened and/or profiled surface 10 made of a material with a high coefficient of adhesive friction relative to the material of the J-tip is used for this purpose. This material for the surface 10 can be, for example, a silicone or rubber material or another, preferably soft, plastic material. The surface material of the J-tip that cooperates therewith can be a material used for the guide wire overall or a coating material with which the guide wire is surface-coated, at least in the region of its J-tip.

In advantageous embodiments, the protective cap 4, as in the example shown, comprises a grip profile 11 on its outer side. This grip profile 11 can facilitate the handling of the protective cap 4 as it is fitted onto the J-tip 5a of the guide wire 5 or onto the insertion aid 1 and removed again and, in addition, can be advantageous in terms of design aspects.

In corresponding embodiments, the proximal sleeve section 6 of the protective cap 4 comprises a rear slot 12, which extends axially forward, i.e. in the digital direction, from the proximal front end of the sleeve section 6 in a predefinable slot length. The rear slot 12 is opposite a corresponding part of the axial slot section 9a of the passage slot 9, so that, in this region of the sleeve section 6, it is divided or split into two sleeve shell halves. This measure can support the function of a snap/latch connection 13 which, in corresponding embodiments as in the example shown, is used to keep the protective cap 4 placed in a snapping in or latching in manner detachably on the insertion aid 1 on the mouthpiece section 1c of the latter.

In the example shown, this snap/latch connection 13 comprises a latch/snap edge 13a projecting radially inward at the proximal front end of the sleeve section 6 of the protective cap 4, on the one hand, and an annular groove 13b at the transition of the mouthpiece section 1c to the clearance section 1a of the insertion aid 1, on the other hand. Assisted by the rear slot 12, the shell halves of the sleeve section 6 can be fitted elastically and flexibly onto the conical mouthpiece section 1c until they snap or latch into the annular groove 13b with the snap/latch edge 13a. The snap/latch connection 13 is implemented in terms of construction such that it is released again by a not excessively high axial pull-off force when the user pulls the protective cap 4 off the insertion aid 1.

In corresponding embodiments, the annular groove 13b comprises a polygonal cross section, and, matching the same, the snap/latch edge 13a comprises a corresponding polygonal shape, a square shape in the example shown. This can be used as an alignment aid, which facilitates the fitting of the protective cap 4 onto the mouthpiece section 1c so as to be aligned in the direction of rotation. In addition, the removal of the protective cap 4 from the mouthpiece section 1c can be facilitated as a result by the protective cap 4 first being rotated somewhat, the result of which is that, because of the interaction of the polygonal shapes on the mouthpiece section 1c, on the one hand, and on the protective cap 4, on the other hand, the sleeve shell halves spread apart somewhat, effecting that the snap/latch connection 13 unlatches and the protective cap 4 can be taken off easily.

In corresponding embodiments, at the proximal front end of the sleeve section 6 of the protective cap 4, one alignment projection, or multiple alignment projections distributed on the circumference are formed as extensions projecting proximally in the axial direction, which engage around a polygonal edge of the insertion aid 1 adjoining the mouthpiece section 1c proximally and, as a result, can function as an alignment aid, which permits the protective cap 4 to be fitted to the insertion aid 1 or its mouthpiece section 1c only in one or more defined rotational positions.

As illustrated in FIG. 10, the result of the contact of the J-tip 5a against the tapering opposite contact surfaces 7a, 7b is that when a thrust force S acts distally from the front on the J-tip 5a, the J-tip 5a does not entirely reach into the receiving space 8 in the radial direction R but maintains a distance from the radial outer termination of the receiving space 8, and the contact surfaces 7a, 7b each exert an opposing contact force K1, K2 on the J-tip 5a which does not act proximally toward the rear counter to the thrust force S but obliquely thereto with a significant force component in the transverse direction, i.e. perpendicular to the radial direction R. This benefits clamping retention of the J-tip 5a in the receiving space 8 and counteracts unintended sliding of the J-tip 5a laterally and rearward, accompanied by corresponding deflection of the guide wire 5 out of the receiving space 8. The component of the thrust force S acting perpendicularly on the oblique contact surfaces 7a, 7b of the receiving section 7, in conjunction with the coefficient of adhesive friction of said contact surfaces 7a, 7b relative to the material of the J-tip, generates a corresponding adhesive frictional force, which prevents or makes it more difficult for the J-tip 5a of the guide wire 5 to slide along on said contact surfaces 7a, 7b.

As the embodiment shown and the other embodiments explained above make clear, the invention provides a J-tip protective cap with which the J-tips of medical guide wires of the corresponding J-tip type can be protected in a very advantageous way before use and which, in particular, prevents or at least considerably makes it more difficult for the J-tip to unintentionally escape on account of thrust forces acting on the guide wire in the distal direction.

The invention claimed is:

1. A J-tip protective cap configured for protecting a J-tip of a medical guide wire, comprising:
    a proximal sleeve section;
    a distal hollow disk-shaped J-tip receiving section, which extends distally and laterally on one side in a distal end region of the sleeve section with a disk longitudinal axis perpendicular to a longitudinal axis of the sleeve section, wherein an interior of the J-tip receiving section forms a J-tip receiving space; and
    a J-tip passage slot which leads into the J-tip receiving space at a proximal side of the J-tip receiving space and which is composed of an axial slot section in the sleeve section and a circumferential slot section in the J-tip receiving section,
    wherein
    the J-tip receiving space comprises a tapered region, in which the J-tip receiving space tapers in a radially outward direction in its lateral width, and opposite inner sides of the J-tip receiving section form, in cross section, two opposing J-tip point contact surfaces with the guide wire in the tapered region of the J-tip receiving space.

2. The J-tip protective cap as claimed in claim 1, wherein a lateral width of the J-tip receiving space tapers conically from a maximum width which is greater than a diameter of the J-tip of the guide wire to be inserted, to a minimum width which is smaller than the diameter of the J-tip to be inserted.

3. The J-tip protective cap as claimed in claim 2, wherein a cone angle of the conical taper of the lateral width of the J-tip receiving space lies in the range between 10° and 90°.

4. The J-tip protective cap as claimed in claim 3, wherein the cone angle of the conical taper of the lateral width of the J-tip receiving space lies in the range between 20° and 60°.

5. The J-tip protective cap as claimed in claim 1, wherein the J-tip receiving section comprises, at least in the region of the contact surfaces, a roughened or profiled surface.

6. The J-tip protective cap as claimed in claim 1, wherein the J-tip receiving section comprises, at least in the region of the contact surfaces, a surface made of a material with a high coefficient of adhesive friction relative to the material of the J-tip of the guide wire to be accommodated.

7. The J-tip protective cap as claimed in claim 1, further comprising: a grip profile on an outer side of the J-tip protective cap.

8. The J-tip protective cap as claimed in claim 1, wherein the proximal sleeve section comprises a rear slot.

* * * * *